US005799247A

United States Patent [19]

Lapinlampi

[11] Patent Number: 5,799,247

[45] Date of Patent: Aug. 25, 1998

[54] FILTER

[75] Inventor: Jari Lapinlampi, Oulu, Finland

[73] Assignee: ADC Solitra Oy, Kempele, Finland

[21] Appl. No.: 678,764

[22] Filed: Jul. 11, 1996

[30] Foreign Application Priority Data

Nov. 8, 1995 [FI] Finland .................................... 955385

[51] Int. Cl.$^6$ ........................................ H04B 1/38

[52] U.S. Cl. ........................................ 455/90; 333/202

[58] Field of Search .............................. 455/90, 128, 347, 455/349; 333/202, 227; 361/814, 748

[56] References Cited

U.S. PATENT DOCUMENTS

| | | | |
|---|---|---|---|
| 3,728,731 | 4/1973 | Choi et al. | 333/202 X |
| 4,019,141 | 4/1977 | Numan et al. | 455/349 X |
| 4,100,504 | 7/1978 | McGann | 455/345 X |
| 4,689,825 | 8/1987 | Geiser | 455/347 |
| 4,706,051 | 11/1987 | Dieleman et al. | 333/212 |
| 4,990,869 | 2/1991 | Chanteau | 333/203 |
| 5,278,528 | 1/1994 | Turunen | 333/203 |
| 5,508,668 | 4/1996 | Prokkola | 333/202 |
| 5,534,829 | 7/1996 | Kobayashi et al. | 333/126 |
| 5,585,771 | 12/1996 | Ervasti et al. | 333/202 |

FOREIGN PATENT DOCUMENTS

| | | | |
|---|---|---|---|
| 441590 | 8/1991 | European Pat. Off. | 333/202 |
| 560503 | 9/1993 | European Pat. Off. | 333/202 |
| 2422398 | 11/1975 | Germany . | |
| 2143092 | 1/1995 | United Kingdom . | |

*Primary Examiner*—Thomas J. Mullen, Jr.

*Attorney, Agent, or Firm*—Ladas & Parry

[57] ABSTRACT

In a shell construction for a filter in a radio equipment having a body, the shell construction has at least one section which is a fixed part of the body, and is integral with the body.

31 Claims, 1 Drawing Sheet

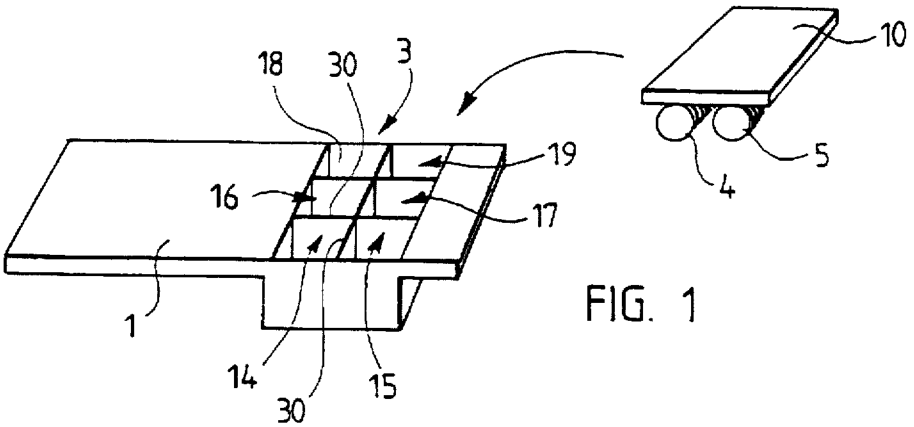
FIG. 1
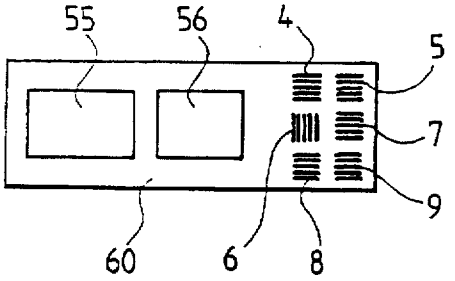
FIG. 4
FIG. 2
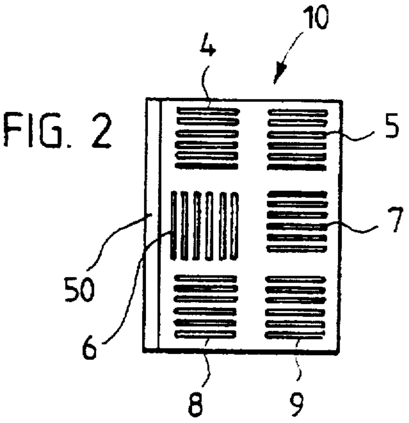
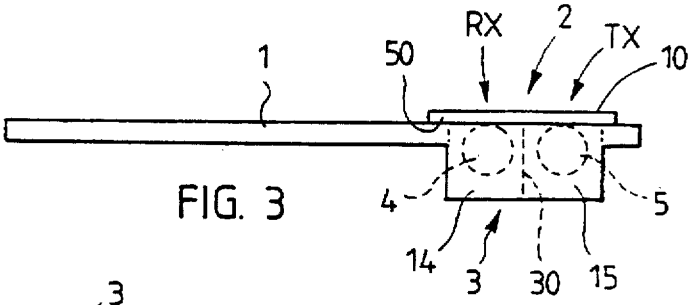
FIG. 3
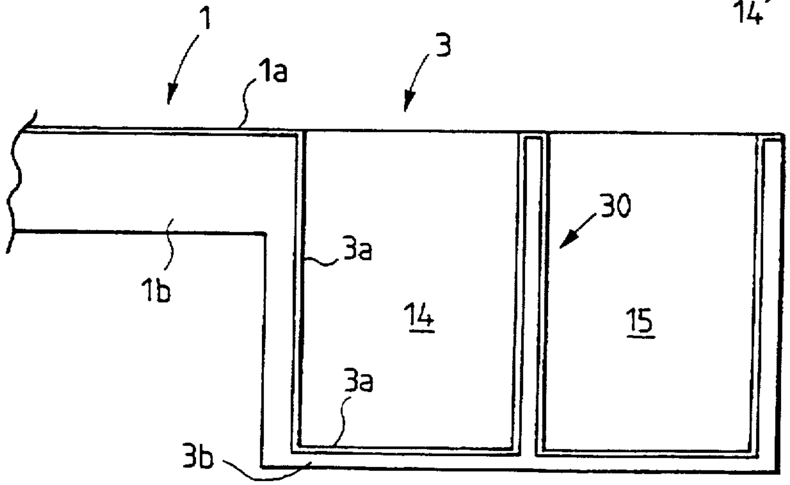
FIG. 5

FILTER

BACKGROUND OF THE INVENTION

The invention relates to a filter for use in a radio equipment, said filter comprising a shell construction with at least one section, and one or more conductor means mounted in the sections of the shell construction.

The invention further relates to a filter used in a radio equipment, said filter comprising a shell construction with at least one section.

The invention can be applied to coaxial and helix-type filters with a conductor means, but also to cavity resonator-type filters.

The term radio equipment used above refers to a transmitter, receiver or transceiver of a high-frequency range, or another apparatus that needs a filter in order to function. The invention is particularly applicable to base stations and mobile stations, i.e. terminal equipments, used in a cellular radio network.

Filters are used for implementing high-frequency circuits, for instance in base stations or mobile stations of mobile telephone networks. Filter constructions can be used, for example, as interface and filtering circuits in the amplifiers of transmitter and receiver units in base stations.

There are several different types of filters comprising a shell construction, or body: e.g. coaxial and helix resonator constructions. In coaxial and helix resonator constructions, the shell envelops a conductor which is positioned in the middle of the shell and which is called a resonator or resonator pin. In coaxial resonators, the conductor is shaped as a pin, whereas in helix resonators it is spiral. In addition, there are cavity resonators, in which the shell construction itself forms the filter.

In mobile phones, for example, the filter is a separate enclosed component which is positioned in a recess in the body of the phone. An enclosed component takes a lot of space and is heavy; it is also expensive and slow to manufacture. The grounding is not the best possible, either. DT 2422398 discloses a filter construction; however, the shell construction of this filter is a separate part attached to the actual body of the phone. Thus even this solution has the above drawbacks.

SUMMARY OF THE INVENTION

The object of the present invention is to provide a new type of filter which obviates the problems associated with the known solutions.

This is achieved with a filter of the invention, which is characterized in that the shell construction of the filter is provided as a fixed part of the body, shell or a similar mechanical construction of the radio equipment, and that the shell construction of the filter is integral with said body, shell or similar mechanical construction of the radio equipment.

The solution of the invention has several advantages. The new structure efficiently utilizes the body of a radio equipment, such as a terminal equipment or a base station, as part of the filter; this simplifies the mechanical structure of the equipment, since the same structural element has two different functions. The solution of the invention saves space and reduces the weight, which is particularly important in portable terminal equipments, i.e. mobile phones. The new solution is also inexpensive to manufacture. In addition, the solution of the invention leaves more space to the conductor means of the filter, e.g. the helix coils or resonators, which makes it possible to provide a filter with better properties.

Yet another advantage is that the grounding of the filter is improved, and disturbances and RF leakages are reduced. The invention is applicable, for example, to helix and coaxial-type filters, and also to cavity resonators.

BRIEF DESCRIPTION OF THE DRAWING

In the following, the invention will be described in greater detail with reference to the accompanying drawings, in which FIG. 1 shows the body of a radio equipment, such as a mobile phone, and the coils of a helix filter, FIG. 2 shows the coils of a helix filter on a separate printed board, FIG. 3 shows the body of a radio equipment and a filter mounted therein, FIG. 4 shows the coils of a helix filter and other components of the radio equipment on the actual printed board of the radio equipment, and FIG. 5 shows the body of a terminal equipment, coated with a conductive material and viewed from the end of the filter facing the shell construction.

DESCRIPTION OF THE PREFERRED EMBODIMENTS

FIG. 3 illustrates a construction which is formed from the parts shown in FIGS. 1 and 2 and which comprises the body 1 of a radio equipment, and a filter 2. The filter 2 comprises a shell construction 3 positioned in the body 1 of the radio equipment, conductor means 4–9 such as helix coils 4–9, and a support structure such as a printed board 10, on which the helix coils 4–9 are mounted. In addition, the printed board comprises a desired switching diagram and, if necessary, some auxiliary components. The filter shown in the figures is, in fact, a duplex-type filter comprising a transmitting filter TX and a receiving filter RX. The filter further comprises an antenna interface, to which the antenna line is connected, and an interface for connecting the filter to the radio parts such as the radio unit 55-56. The helix coils 4–9 are spiral conductors one ends of which are unconnected, i.e. free.

The invention thus relates to a high-frequency filter 2 used in connection with a radio equipment, such as a terminal equipment or a base station of a cellular network. The filter thus comprises a shell construction 3 with at least one section, e.g. six sections 14–19. In addition, the filter comprises at least one conductor means, e.g. six conductor means 4–9, or helix coils 4–9, or helix resonators 4–9. The conductor means 4–9 are mounted in the sections 14–19 of the shell construction 3, which can be seen from FIGS. 1 to 3, particularly from FIG. 3. Especially from FIGS. 1 and 3 it can be seen that, according to the invention, the shell construction 3, 14–19 of the filter 2 is made as a fixed part of the body, shell or a similar mechanical construction of the radio equipment. The example shown in FIGS. 1 and 3 applies particularly to the body 1 of a mobile phone, but the invention can also be implemented with the shell construction of a radio equipment.

In the filter of the invention, a mechanical construction of the radio equipment forms at least the main part of the shell construction 3 of the filter 2 in the radio equipment.

In a preferred embodiment, the filter 2 is a filter used in a terminal equipment of a cellular radio network. In this case, the shell construction 3 of the filter 2 is a fixed part of the body 1 of the terminal equipment and integral with the body of the terminal equipment, i.e. they are made in one piece. In another possible embodiment, the shell construction 3 of the filter 2 is a fixed part of the shell construction 1 of the terminal equipment and integral with it. The body 1 of the radio equipment, or correspondingly the shell construction of the radio equipment, and the shell construction 3 of the filter 2 mounted therein can be manufactured, for example, by pressure moulding, milling, or impact extrusion. Another alternative manufacturing technique will be described below with reference to FIG. 5.

As stated above, the filter according to a preferred embodiment is a duplex filter 2 comprising a transmitting filter and a receiving filter. In the filter 2 of the preferred embodiment, the body 1, shell or a similar mechanical construction of the radio equipment forms the shell construction 3 of both the transmitting filter TX and the receiving filter RX.

In a preferred embodiment, the filter is a multi-circuit filter and comprises a plurality of conductor means 4–9, a plurality of sections 14–19 in the shell construction, and partitions 30 between the sections. It can be seen from FIG. 2 that the cavities 14–19 provided in the body 1 of the mobile phone form the shell construction 3 for the helix coils 4–9 on a printed board. In such a filter, the partitions 30 are a fixed and integral part of the body 1 or shell construction of the radio equipment.

The conductor means 4–9, e.g. helix coils 4–9, in the filter 2 are mounted on a support structure 10, e.g. a printed board 10. With reference to FIGS. 2 and 3, in particular, the support structure 10 comprises a conductive area 50 in direct contact with the body 1 or shell of the radio equipment. This is an easy way of providing proper grounding for the filter 2.

In the preferred embodiment of the invention shown in FIG. 4, the conductor means 4–9 are mounted on the same support structure 60 as the actual radio parts 55–56, e.g. the radio unit 55-56, of the radio equipment. In this case, the conductor means 4–9, e.g. the helix coils 4–9, are integrated with the actual printed board 60 of the radio equipment. This 'double-integrated' solution has the advantage of simplifying the structure of the filter and the entire radio equipment.

FIG. 5 illustrates a preferred embodiment with respect to the manufacturing technique, the shell construction 3 of the filter, and the body construction 1 of the radio equipment. In this preferred embodiment, at least the shell construction 3 of the filter comprises a coating *3a* which is of a conductive material and which is provided on a basic material *3b* of e.g. plastic. Even this embodiment has the essential feature of the invention that the shell construction 3, *3a*, *3b* of the filter is made as a fixed part of the body 1, shell or a similar mechanical construction 1 of the radio equipment, and that the shell construction 3, *3a*, *3b* of the filter is integral with said body 1, shell or similar mechanical construction 1 of the radio equipment.

Most preferably, in addition to the area of the shell of the filter, even other parts of the construction are provided with a coating *1a* of a conductive material on top of the basic material *1b* of the body 1, shell or similar mechanical construction of the radio equipment. Most preferably, an object *1b*, *3b* is thus at first injection moulded from a basic material, such as plastic, and then coated with a conductive coating *1a*, *3a*, such as a metal coating. In view of the manufacturing technique, the solution that is the simplest and has the best electrical properties is a construction which is coated throughout, at least on the side with the shell construction 3 of the filter. When the coating adheres to the material to be coated, the coating and the basic material become integral.

The different embodiments of the invention are for the most part also applicable to filters of the cavity resonator and coaxial resonator type, although the examples relate mainly to a helix-type filter. In the case of a cavity resonator, the shell construction may be similar to the one described above except that the filter does not comprise conductor means, i.e. resonators.

Although the invention has been described above with reference to the examples illustrated in the accompanying drawings, it will be clear that the invention is not restricted to these examples but can be modified in many ways within the inventive concept disclosed in the appended claims. In addition to the applications disclosed above, the filter can also have other applications.

I claim:

1. In a radio equipment having a body and filter the filter comprising a shell construction with at least one section and a conductor means mounted in the section of the shell construction, the improvement wherein:

the shell construction is a fixed part of the body; and the shell construction is integral with the body.

2. The radio equipment according to claim 1, wherein the radio equipment is a terminal equipment of a cellular radio network.

3. The radio equipment according to claim 2, wherein the filter is a multi-circuit filter and the at least one section is a plurality of sections in the shell construction with a partition construction between the sections, and the partition construction is a fixed part of the body.

4. The radio equipment according to claim 3, wherein the filter is a duplex filter comprising a transmitting filter and a receiving filter, and the body forms the shell construction of both the transmitting filter and the receiving filter.

5. The radio equipment according to claim 2, wherein the filter is a duplex filter comprising a transmitting filter and a receiving filter, and the body forms the shell construction of both the transmitting filter and the receiving filter.

6. The radio equipment according to claim 1, wherein the radio equipment is a base station of a cellular radio network.

7. The radio equipment according to claim 6, wherein the filter is a multi-circuit filter and the at least one section is a plurality of sections in the shell construction with a partition construction between the sections, and the partition construction is a fixed part of the body.

8. The radio equipment according to claim 7, wherein the filter is a duplex filter comprising a transmitting filter and a receiving filter, and the body forms the shell construction of both the transmitting filter and the receiving filter.

9. The radio equipment according to claim 6 wherein the filter is a duplex filter comprising a transmitting filter and a receiving filter, and the body forms the shell construction of both the transmitting filter and the receiving filter.

10. The radio equipment according to claim 1, wherein the filter is a duplex filter comprising a transmitting filter and a receiving filter, and the body forms the shell construction of both the transmitting filter and the receiving filter.

11. The radio equipment according to claim 10, wherein the filter is a multi-circuit filter and the at least one section is a plurality of sections in the shell construction with a partition construction between the sections, and the partition construction is a fixed part of the body.

12. The radio equipment according to claim 1, wherein the filter is a multi-circuit filter and the at least one section is a plurality of sections in the shell construction with a partition construction between the sections, and the partition construction is a fixed part of the body.

13. The radio equipment according to claim 1, wherein the conductor means is mounted on a support structure and the support structure comprises a conductive area in direct contact with the body.

14. The radio equipment according to claim 1, wherein the conductor means are mounted on a support structure for other parts of the radio equipment.

15. The radio equipment according to claim 1, wherein the shell construction and the body are made in one piece by pressure moulding, milling or impact extrusion.

16. The radio equipment according to claim 15, wherein the filter is a multi-circuit filter and the at least one section is a plurality of sections in the shell construction with a partition construction between the sections, and the partition construction is a fixed part of the body.

17. The radio equipment according to claim 16, wherein the filter is a duplex filter comprising a transmitting filter and a receiving filter, and the body forms the shell construction of both the transmitting filter and the receiving filter.

18. The radio equipment according to claim 15 wherein the filter is a duplex filter comprising a transmitting filter and a receiving filter, and the body forms the shell construction of both the transmitting filter and the receiving filter.

19. The radio equipment according to claim 1, wherein the shell construction has a coating of a conductive material on a different material.

20. The radio equipment according to claim 19, wherein the body has coating of a conductive material on the different material.

21. The radio equipment according to claim 1, wherein the radio equipment is a transceiver equipment of a cellular radio network.

22. In a shell construction for a filter in a radio equipment having a body, the improvement wherein the shell construction has at least one section, is a fixed part of the body, and is integral with the body.

23. The radio equipment according to claim 22, wherein the radio equipment is a terminal equipment of a cellular radio network.

24. The radio equipment according to claim 22, wherein the radio equipment is a base station of a cellular radio network.

25. The radio equipment according to claim 22, wherein the filter is a duplex filter comprising a transmitting filter and a receiving filter, and the body forms the shell construction of both the transmitting filter and the receiving filter.

26. The radio equipment according to claim 22, wherein the filter is a multi-circuit filter and the at least one section is a plurality of sections in the shell construction with a partition construction between the sections, and the partition construction is a fixed part of the body.

27. The radio equipment according to claim 22, wherein the shell construction and the body are made in one piece by pressure moulding, milling or impact extrusion.

28. The radio equipment according to claim 27 wherein the filter is a duplex filter comprising a transmitting filter and a receiving filter, and the body forms the shell construction of both the transmitting filter and the receiving filter.

29. The radio equipment according to claim 1, wherein the shell construction has a coating of a conductive material on a different material.

30. The radio equipment according to claim 27, wherein the body has coating of a conductive material on the different material.

31. The radio equipment according to claim 22, wherein the radio equipment is a transceiver equipment of a cellular radio network.

* * * * *